C. W. BARRETT.
ELASTIC TIRE FOR AUTOMOBILES.
APPLICATION FILED MAR. 4, 1912.
1,066,784.
Patented July 8, 1913.
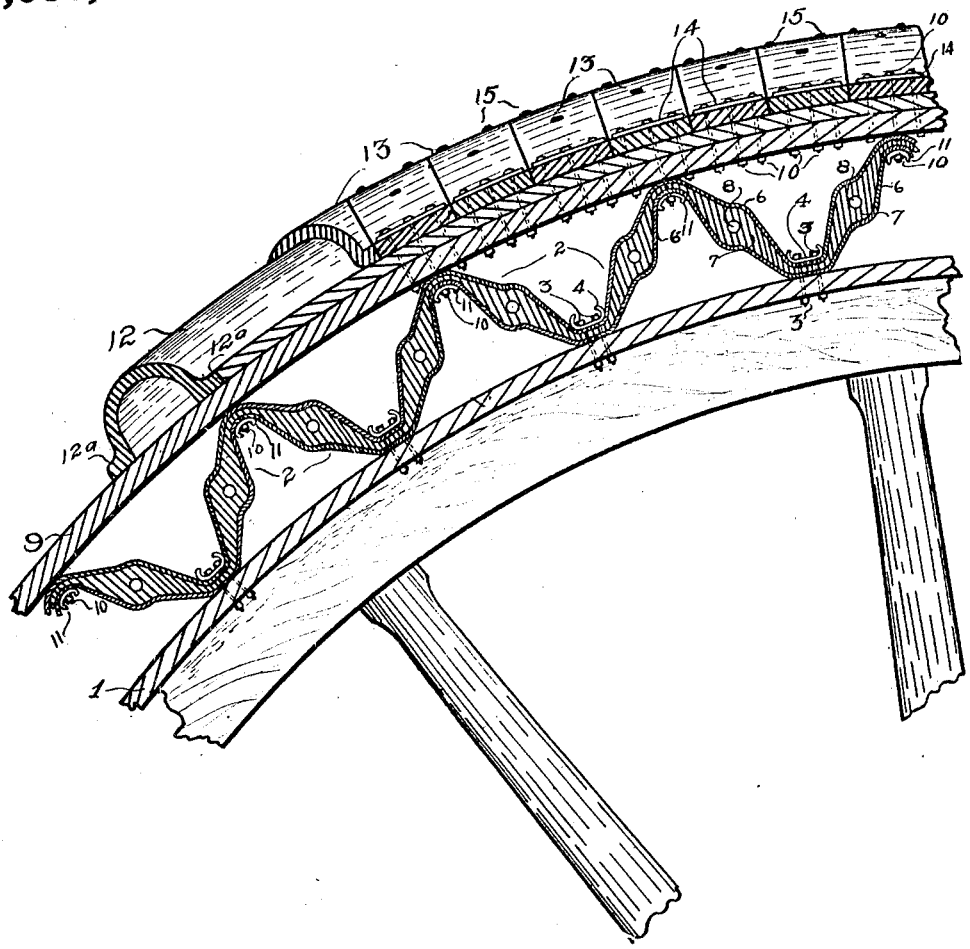
WITNESSES
E. Cozzens
J. B. Cambers
INVENTOR
Charles W. Barrett
BY F. C. Bates
His ATTORNEY

UNITED STATES PATENT OFFICE.

CHARLES W. BARRETT, OF SAN JOSE, CALIFORNIA.

ELASTIC TIRE FOR AUTOMOBILES.

1,066,784.  Specification of Letters Patent.  Patented July 8, 1913.

Application filed March 4, 1912.  Serial No. 681,369.

*To all whom it may concern:*

Be it known that I, CHARLES W. BARRETT, a citizen of the United States, residing at San Jose, in the county of Santa Clara and State of California, have invented a new and useful Improvement in Elastic Tires for Automobiles, of which the following is a specification.

My invention relates to improvement in an elastic tire for automobiles, and the objects of my invention are 1st, to so construct an elastic tire that will have the elasticity required, and also an elastic tire that will be sufficiently strong enough to carry the load required; 2, to so construct an elastic tire that all parts thereof can be readily adjusted, and one that the tread or any other part thereof can be replenished without removing the tire from the wheel.

Another object of my invention is to produce an elastic tire whereby the parts thereof can be transferred to any ordinary automobile wheel transforming the same into an elastic tire wheel giving the resilience and strength required.

I attain these objects by means of the parts illustrated in the accompanying drawings, in which the figure is a side view of a segment of the elastic tire embodying my invention.

In the drawing similar numerals refer to similar parts.

My invention consists of a metallic rim shown at 1, of the required size and thickness fastened to the felly of a wheel. To this rim 1, is belted elastic sections 2, by bolts 3, which pass through curved metallic plates 4, and rim 1. These elastic sections are made of an outer casing of leather or any other suitable material as shown at 6, having an inner filling of rubber as shown at 7. This filling is rounding at the center, and tapers each way, having a hole through the largest part thereof, shown at 8. This hole is for the purpose of allowing the rubber to more readily become elastic when the weight comes upon the same. These sections are then fastened to rim 9, by bolts as shown at 10, said bolts passing through a curved metallic plate 11, and through rim 9, and through the flanges of outer tread rim 12, and through the flanges of section tread layers 13, and section plates 14. Rim 9 is made of steel of the required width and thickness to which is fastened outer tread rim 12, by bolts 10. Outer tread rim 12, is made of cast-steel or any other suitable metal in an endless circle with flanges on each side as shown at 12$^a$. The same is fastened to rim 9 by bolts, as shown at 10. On the outside of outer tread rim 12, is tread section layers 13, and section plates 14, fastened to the flanges 12$^a$, by bolts 10. These outer treads are made in sections of two or more layers of rubber or any other suitable material being riveted together by rivets as shown at 15. Sectional plates 14 are made of steel of the proper width and thickness and are placed at the flanges of tread sections 13, and are held in place by bolts 10, and are for the purpose of giving a flat surface to the flanges of tread sections 13. Curved metallic plates 4, are made of steel or any other suitable metal the same having curved sides, and are for the purpose of giving a flat surface protecting and connecting the ends of elastic sections 2, by bolts 3. Curved metallic plates 11, are made of steel or any other suitable metal having curved sides and are for the purpose of giving a flat surface and protecting the center of elastic sections 2, at the point of connection to rim 9.

Having thus described my invention, what I claim as new and desire to secure by Letters Patent, is—

In an elastic tire for automobiles, the combination of an inner rim and an outer rim, elastic sections made of leather with an inner filling of rubber, said rubber having a hole through the center thereof, and means of fastening said elastic sections between said inner rim and said outer rim, metallic connecting and protecting plates having curved sides, and means of fastening the same to said elastic sections and said inner rim and said outer rim, as and for the purpose described.

In witness whereof I have hereunto set my hand, this 24 day of February, 1912.

CHARLES W. BARRETT.

Witnesses:
J. B. CAMBERS,
WILLIAM HAUSER.